June 14, 1949. S. J. WALKER ET AL 2,473,316

RAILWAY BRAKE BEAM

Filed Jan. 4, 1947

INVENTORS:
IRVIN J. SPAETH
SAMUEL J. WALKER

BY *Rodney Bedell*
ATTORNEY.

Patented June 14, 1949

2,473,316

UNITED STATES PATENT OFFICE 2,473,316

RAILWAY BRAKE BEAM

Samuel J. Walker, Lake Forest, and Irvin J. Spaeth, Chicago, Ill., assignors to Chicago Railway Equipment Company, Chicago, Ill., a corporation of Illinois Application January 4, 1947, Serial No. 720,178

8 Claims. (Cl. 188—223.1)

The invention relates to railway rolling stock brake gear and more particularly to the construction of a truss type brake beam arranged to be slidingly supported at its ends upon the truck frame, the braking forces being applied intermediate the ends of the beam.

It is customary to mount such brake beams so that their main members and the centers of the brake shoes are below the level of the centers of the wheels and the beam supporting brackets are inclined to the horizontal at an angle of approximately 12° so that the beams move radially of the wheels as the brakes are applied and released. The braking forces are applied to the beam horizontally through the brake lever at a point in the truss forwardly of the points of support. This results in the application of a torsional stress to the beam tending to rotate it forwardly and downwardly which tendency is resisted by the supports positioned lengthwise of the beam beyond the brake heads and shoes. The resulting actions and reactions tend to thrust the beam in opposite directions, about its longitudinal axis, at each end portion where the compression and tension members of the truss join and where the thrust against the wheels is concentrated. Also the weaving of the side frames in relation to each other, due to uneven track conditions, curves and wear of wheels, bearings, etc., tends to misalign one truck side frame with the opposite side frame, thus bringing torsional strains on the end portions of the beam. These conditions create a problem in making the beam strong enough to resist the forces and it is the main object of the invention to so construct the beam that these conditions may be best met and thereby avoid likelihood of undue distortion, or breaking, of the beam end portions.

Generally speaking, the desired result is obtained by disposing the compression member of the beam, which mounts the brake heads so that its ends and adjacent portions have no initial twist about the longitudinal axis of the member and so that it has substantial web-like elements disposed in the plane or parallel to the plane of movement of the beam to and from the wheels, i. e., at an inclination to the horizontal, and at the same time disposing the beam truss in the plane, or parallel to the plane, of the application of the braking forces, i. e., horizontally.

In the accompanying drawings illustrating selected embodiments of the invention—

Figures 2, 3, 4:
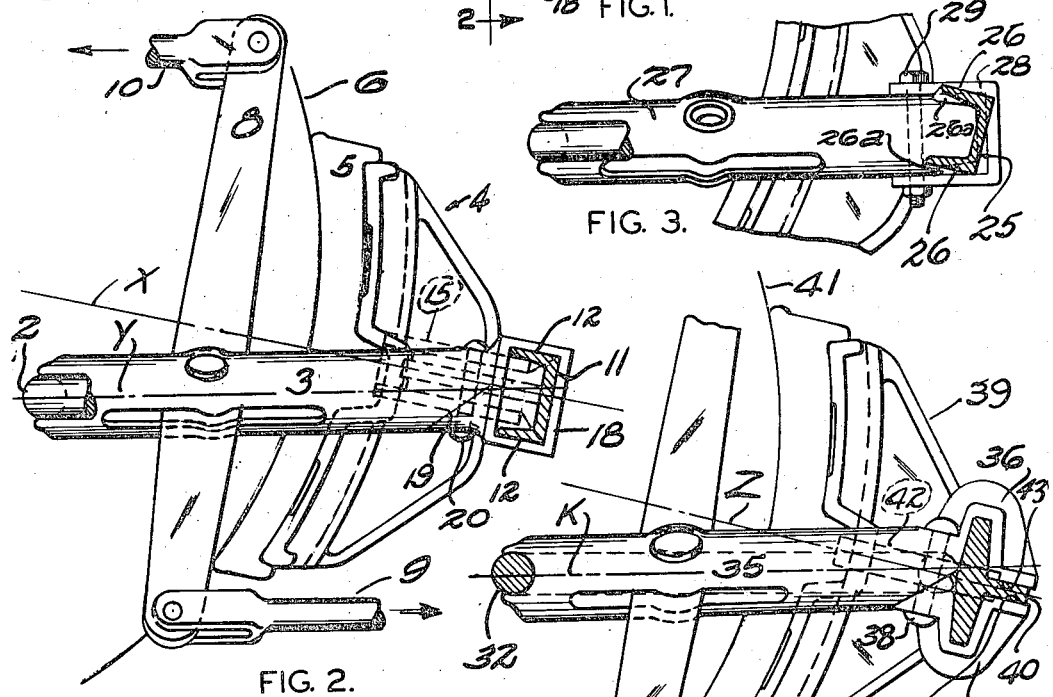
Figure 2 is a vertical section taken approximately on the line 2—2 of Figure 1 and drawn to enlarged scale and indicating diagrammatically the direction of movement of the brake heads to and from the wheels and the direction of application of braking forces to the beam.
Figure 3 is a detail section corresponding to a portion of Figure 2 but illustrating another arrangement of the channel compression member.

Figure 4 corresponds to Figure 2 but illustrates another type of truss forms.

Figure 5:
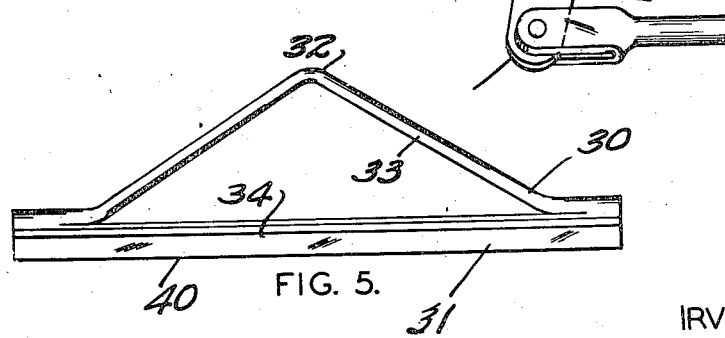

Figure 5 is a top view of the beam compression and tension member shown in Figure 4.

Figure 1:
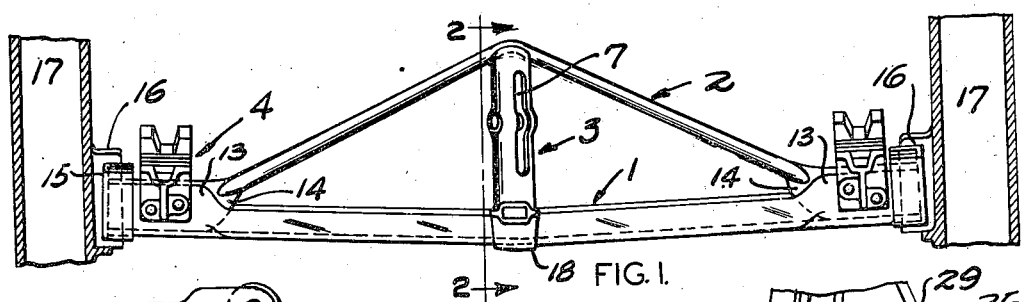
Figure 1 is a top view of a truss type brake beam made in accordance with the invention with adjacent portions of the truck side frames which support the beam being indicated.

The beam shown in Figures 1 and 2 includes a main compression member 1 of channel cross section, a tension member 2 of round rod section, a strut 3 preferably consisting of a tubular casting, and brake heads 4 corresponding to heads in general use and adapted to mount renewable shoes 5 which are applied to the treads 6 of the truck wheels. Strut 3 is slotted at 7 for the usual brake lever 8 connected at its lower end by bottom connection 9 to a corresponding lever on an adjacent brake beam and connected at its upper end by pull rod 10 to the brake cylinder lever which may be mounted upon the truck or upon the car body.

At the end portions of the beam, the back web 11 of compression member 1 is reduced in height and the top and bottom flange webs 12 increased in depth as indicated at 13. The end portions of tension member 2 are upset and flattened as indicated at 14 and are received between the top and bottom flange webs of the compression member and cooperate with the latter to form a head mounting end portion of substantial depth along or parallel to the plane, indicated by the line $x$, disposed radially of the wheels to which the brake shoes are applied.

Intermediate the ends of the beam, tension member 2 does not lie in the plane indicated by the line $x$ but extends forwardly of the beam and downwardly of said plane and, with strut 3 and the compression member as a whole, defines the general plane of the beam which is disposed horizontally as indicated by the line $y$, the same being parallel to rod 10 which indicates the direction of application of brake forces to the beam.

Preferably renewable wear plates 15 are applied to one or both faces of the channel end portions 13 and the beam is supported through plates 15 on bracket or guide elements 16 on the truck side frames 17.

Preferably the disposition of the compression member flange webs 12 parallel to the plane of movement of the beam is maintained from end to end of the beam and strut 3 has its loop 18 offset from the longitudinal axis of the strut to receive the compression member of the beam which is disposed asymmetrically of the strut axis. The loop is split as indicated at 19 to facilitate its application to the compression member, the split parts being secured together by a rivet 20.

Figure 3 illustrates a modification of this central portion of the beam in that the compression member 25 has a restricted portion twisted about its longitudinal axis so that its top and bottom flanges 26 are disposed horizontally as indicated at 26a. Strut 27 has a removable loop forming bar 28 applied over the restricted twisted portion of the channel member and secured by a bolt 29.

Figures 4 and 5 illustrate another form of the invention in which the compression and tension members of the beam are formed from a structural steel shape comprising a combined rod section 30 and T-like section 31 split adjacent the merging of the rod and T head longitudinally from a point near one end of the beam to a point near the other end of the beam with the center 32 of the separated rod portion 33 drawn away from the remainder 34 of the T section to form a truss triangle. The strut 35 corresponds to the strut previously described but the right-hand end of the strut receiving the compression member is contoured accordingly to form opposing jaw-like elements 36 and 37, the jaw element 37 being separable from the body of the strut and riveted thereto as indicated at 38. Jaw element 37 and strut 35 have engaging surfaces 43. The non-split end portions of the beam are forged down to form seats 42 for the brake heads 39 and to extend outwardly of the brake heads to engage, directly or through suitable wear plates, the supporting guides on the truck side frames as indicated at 16 in Figure 1.

The web 40 forming the stem of the T section is disposed in the plane of movement of the beam indicated by the line z extending radially of the wheel 41 but the separated rod-like portion 33 of the beam is bent downwardly from the plane indicated by the line z to lie in a horizontal plane as indicated by the line k. Thus the beam corresponds to the beams previously described in having a brake head and support engaging portions of substantial depth disposed in a plane extending radially of the wheel although the general plane of the beam including strut 35 is disposed horizontally in the direction of the application of the braking force to the beam.

In each form of the invention, the shoe contacting face of the brake head is disposed perpendicularly to the plane along which the beam moves to and from wheel engaging position. The application of the shoes to the wheel does not set up a twisting action in the brake beam and the beam is adapted to resist the forces applied to it more effectively than if it were made in the conventional manner with projecting end portions twisting to slidably engage the inclined supports on the side frame.

It will be understood that beam compression members having cross sections of different shape than those illustrated may be used and that other details of the construction may be varied without departing from the spirit of the invention and the exclusive use of those modifications coming within the scope of the claims is contemplated.

What is claimed is:

1. In a railway brake beam, a compression member, a tension member and a strut member, said members forming a truss and defining the general plane of the beam, the compression member being of angular cross section with web-like structure extending substantially throughout the length of the member in a plane inclined slightly to said general plane of the beam.

2. In a railway brake beam, a compression member, a tension member and a strut member, said members forming a truss and defining the general plane of the beam, brake heads carried by said compression and tension members, said compression member including a web extending transversely of the length of the beam in a plane inclined at an acute angle to said general plane of the beam and extending longitudinally of the beam a substantial distance outwardly beyond the heads and inwardly beyond the juncture with the tension member.

3. In a railway brake beam, a compression member, a tension member and a strut member forming a truss defining the general plane of the beam, brake heads mounted on the truss with their shoe-carrying faces inclined from the perpendicular to said plane, said compression member being of angular section and including brake head mounting web structure disposed in a plane perpendicular to said faces and inclined to said general plane.

4. In a railway brake beam, a compression member, a tension member and a strut member forming a truss defining the general plane of the beam, brake heads mounted on the truss with their shoe-carrying faces inclined from the the perpendicular to said plane, said compression member being of channel cross section with its flange webs perpendicular to said faces and inclined from said general plane.

5. In a railway brake beam, a compression member, a tension member and a strut member forming a truss and defining the general plane of the beam, said compression member being of angular cross section with a web portion inclined approximately 12° from said plane substantially from end to end of the beam, and a brake head mounted on the compression member with its wheel opposing surface similarly inclined from the perpendicular to said plane.

6. A railway brake beam compression member of channel cross section with brake head-mounting end portions and with a strut-mounting intermediate portion of restricted length in which the member is twisted about its longitudinal axis to incline its back web and flange webs from their respective planes at the brake head-mounting portions.

7. A railway truss type brake beam strut comprising an elongated body having a seat at one end for the beam tension member and a loop at the other end for enclosing a beam compression member of angular cross section, the loop being disposed asymmetrically of the longitudinal axis of the strut body to receive a beam angular compression member inclined to said axis of the strut body.

8. In a railway brake arrangement, a truss type brake beam with a compression member, tension member and a strut member defining the general plane of the beam with the same being disposed substantially horizontally and parallel to the level of the axis of the associated wheels, the beam being supported on guides inclined to the horizontal so that the beam moves radially of said wheels as the brakes are applied and released, the compression member of the beam being of angular cross section with a web extending substantially parallel to the plane of said guides and inclined to said horizontal general plane of the beam.

SAMUEL J. WALKER.
IRVIN J. SPAETH.

REFERENCES CITED

The following references are of record in the file of this patent:

UNITED STATES PATENTS

| Number | Name | Date |
|---|---|---|
| 2,170,114 | Busch | Aug. 22, 1939 |